Dec. 25, 1928.  1,696,630

F. E. FITCH ET AL

DIRECT READING VISCOSIMETER

Filed July 15, 1924  2 Sheets-Sheet 1

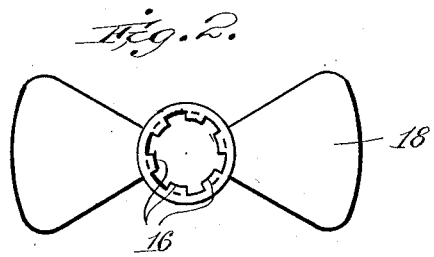
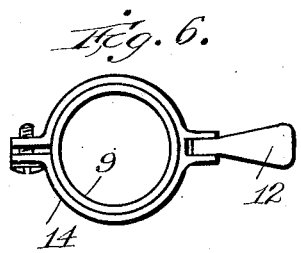
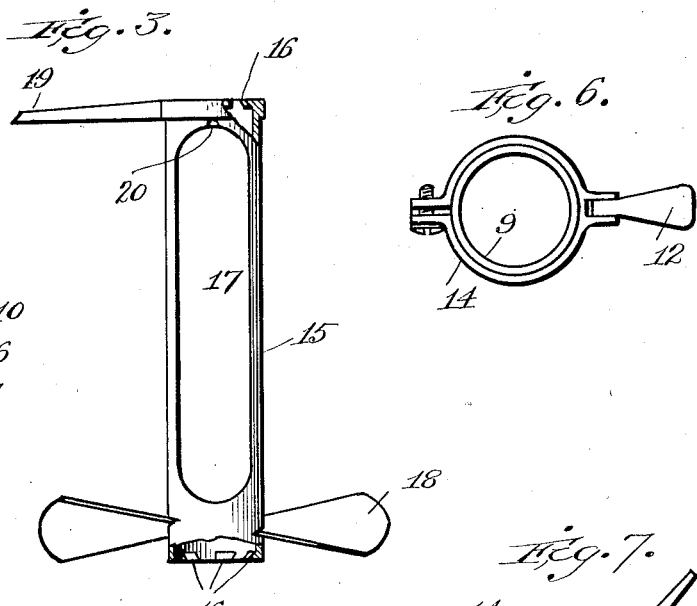
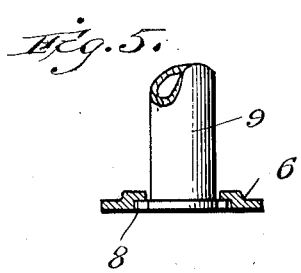
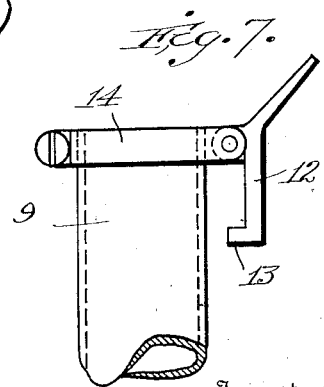

Patented Dec. 25, 1928.

1,696,630

UNITED STATES PATENT OFFICE.

FRANCIS ELLERY FITCH, OF PHILADELPHIA, PENNSYLVANIA, AND MAYSON WHITE TORBET, OF JACKSON, MICHIGAN.

DIRECT-READING VISCOSIMETER.

Application filed July 15, 1924. Serial No. 726,191.

Our invention relates to viscosimeters, i. e., instruments for measuring the fluidity of liquids, viscosity being a general term describing the internal friction of liquids or friction between particles of a liquid.

One of the objects of our invention is the provision of a device which permits a quick and accurate determination of the degree of viscosity or the fluidity of a liquid.

Another object is an instrument of the character referred to which is simple in construction and operation.

For a full understanding of the invention, the principle of operation upon which it is based and the advantages thereof, reference is made to the accompanying drawings, in which—

Fig. 2 is a plan of the rotating element;

Fig. 3 is an elevation, partly in section, of the rotating element;

Fig. 4 is a plan of the device for securing the central tube in place in the inner container;

Fig. 5 is an elevation, partly in section, of the device for securing the central tube in place in the inner container;

Fig. 6 is a plan of the device for releasing the rotating element; and

Fig. 7 is an elevation of the device for releasing the rotating element.

Figure 1:
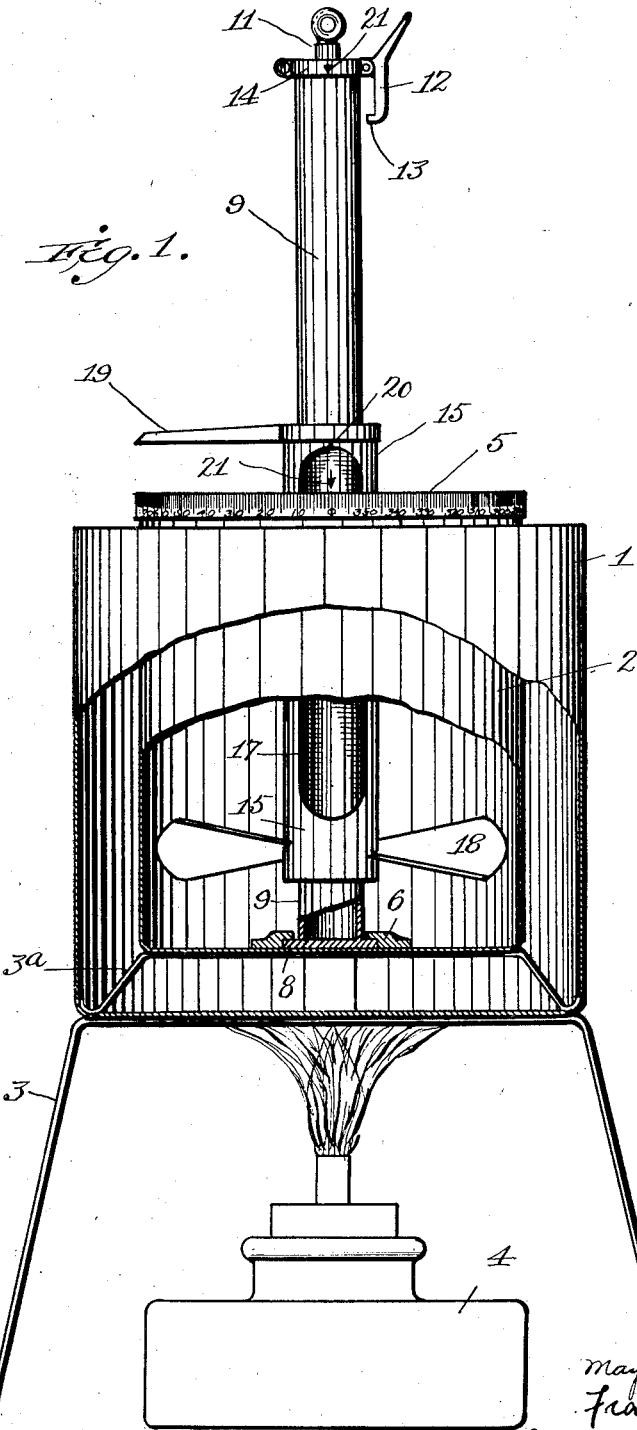
Fig. 1 is an elevation, partly cut away and in section, of the complete instrument.

The invention is based upon the utilization of a suitable force, preferably the force of gravity for furnishing a reliable direct indication, and more particularly upon the translation of the force of gravity into angular horizontal motion of a suitably movable element.

The invention, broadly expressed comprises a body for motion, in response to a suitable force, preferably the force of gravity, in a viscous liquid to be investigated and means on or associated with the said body, so constructed as to undergo under the reaction of the liquid upon it, an angular movement and preferably a rotary movement.

The invention is based on the theory that the angular motion in horizontal direction induced by the action of a liquid upon the movable element on the falling body varies as a function of the viscosity of the liquid and that the extent of the horizontal motion per unit of vertical movement may be utilized as a measure of viscosity. The area, pitch and weight of a propeller, for instance, being constant, the angle through which the propeller rotates during its fall is inversely proportional to a function of the viscosity of the liquid.

In our practice we calibrate the instrument in terms of degrees of angle compared with degrees Engler, or seconds, Saybolt, which are the accepted standards for measuring the viscosity of liquids. Suitable plotting curves may be resorted to for showing the relation between degrees of angle and the units of viscosity or the instrument may itself be graduated in accordance with one or more of the standard viscosity scales.

Again referring to the drawings, 1 is a metal container or cup, which when filled with water forms a water-bath for the inner cup 2, the cup 1 being supported by a stand or tripod 3 over a source of heat such as a Bunsen burner or alcohol lamp 4. The inner cup 2 is supported in the cup 1 by a stand 3$^a$ in a manner such as to provide a water-jacket or bath of uniform thickness around the cup 2. The upper rim of the cup 2 is graduated in degrees 5.

To the bottom of the cup 2 is permanently secured a bayonet-joint ring 6 provided with two or more openings for insertion of the projections 8 on the bottom of the central tube 9 and also provided with a stop-pin 10 to insure that the central tube 9 may always be clamped in the same position with respect to the graduations 5 on the inner cup 2. The space inside of the tube 9 is used as a thermometer-well or cup for the thermometer 11 which is used to measure the temperature of the oil or other liquid under investigation. The upper end of the tube 9 is provided with a releasing device composed of a lever 12 provided with a projection 13, the lever being suspended from a clamping-band 14. Slidably and rotatably supported upon the tube 9 is a sleeve 15 having on the inside, at top and bottom, sharp inwardly-projecting edges 16 to reduce the friction of the sleeve 15 on the tube 9, and being cut away on each side to form large openings 17 to reduce the friction of the sleeve in the liquid and to permit the escape of air-bubbles from the space between the sleeve and the tube. Forming a part of the sleeve 15 is a screw-propeller 18 of suitable pitch and area of blades to provide sufficient rotation of the sleeve 15. permanently fixed to the upper end of the sleeve 15 is a pointer 19 which is of sufficient length to project over the graduations 5, whereby the angle of rotation of the sleeve 15 may be read. A notch 20 is cut at the top of one of the openings 17 in the sleeve 15 into which the projection 13 on the lever 12 is placed when the sleeve and propeller are suspended prior to taking a reading, and, to insure permanence of the "zero position" of the pointer, reference-marks 21 are placed upon the tube 9 and the clamping-band 14, so that, when the inner end of the pointer is placed in juxtaposition to the marks 21, the outer end of the pointer must be perpendicularly over the zero of the graduations 5.

The instrument may be calibrated in various ways. All that is necessary is to use liquids the viscosity of which at different temperatures is known and then either mark the scale 5 accordingly or plot a viscosity—angular deflection curve from which for each angle the viscosity may be read off. To obtain the largest possible scale range, a plurality of liquids of different viscosities from the smallest to the largest values may be chosen and the intermediate values may be readily obtained by heating the different liquids to change the viscosity over the desired range or by diluting a viscous liquid with a less viscous liquid, as is well understood.

When the viscosity of a liquid is to be found, the cup 2 is filled with the liquid and the sleeve and the propeller allowed to fall through it. The angular deflection of the pointer 19 then is a measure of the viscosity or the fluidity at the particular temperature of the liquid. By heating the liquid in the manner described and stirring the liquid to obtain a reliable temperature indication, the viscosity of the liquid may be determined over any desired temperature range.

The foregoing description relates to a particular embodiment of the invention. It is readily understood that the principle of operation upon which the invention is based, may be carried out in various forms. Any movement of a body through a liquid, which automatically induces a secondary motion of the body or a part thereof and the measurement of this secondary motion is within the scope of this invention.

The translation of the force of gravity into a rotary motion of the body is merely one mode of accomplishing the purpose, although this mode is what we at present consider the most advantageous mode of operation.

The force of gravity has been chosen merely as the most convenient force available and as a force which is present in nature as a constant factor and for the reason that its application leads to the simplest form in which the invention may be carried out.

While we have shown a receptacle for the liquid, such receptacle, as desirable as it is for various practical purposes, is not necessary for carrying out the invention within the border scope thereof.

We have endeavored to make our instrument universal in that calibration curves may be constructed for any or all of the various viscosity scales, but we make it direct reading according to any preferred viscosity scale by supplementing the graduations in degrees with the standard viscosity scale of any accepted viscosimeter. While our first effort was to devise an instrument suitable for determining the proper temperature at which to burn fuel oils without the use of stop-watches, expensive glassware, and corrections for specific gravity and meniscus, we have in addition produced an instrument eliminating the time element and specific gravity from the measurement of viscosity, at the same time suitable, sensitive and comparatively accurate for use in measuring the viscosity of lubricating and fuel oils generally.

What we claim is:

1. A viscosimeter comprising an element for movement in a body of liquid to be tested, said element being constructed to undergo, when bodily moved through the liquid, a separate and distinct movement in definite angular relation to the said bodily movement, means for applying a known force tending to move the said element, means for limiting the extent of movement in said direction and means for indicating the extent of the separate movement of the element incident to the movement thereof by said force.

2. A viscosimeter comprising an element for movement in a body of liquid to be tested, said element being constructed to undergo, when bodily moved through the liquid, an angular movement, means prescribing a definite path of bodily movement for the element, means for applying a known force tending to bodily move the element in the prescribed path and means for indicating the extent of the angular movement.

3. A viscosimeter comprising an element for movement through a body of liquid to be tested, said element being constructed to undergo, when bodily moved through the liquid, an angular movement, means prescribing a path of bodily movement for the element, means for applying a known force tending to bodily move the element through the prescribed path, means for assigning to the element a definite angular position in an initial position in said path and means for indicating the change of angular position of the element in a final position.

4. A viscosimeter comprising a propeller, means for mounting the propeller to have free rotary movement and bodily movement in the direction of the axis of rotation, means for limiting the extent of axial movement and means for indicating the extent of rotary movement relatively to a definite point of reference.

5. A viscosimeter comprising a propeller, a frame and means thereon for supporting the propeller for free bodily movement in a vertical direction and for free rotary movement about a vertical axis, means for normally supporting the propeller in an upper initial position and for holding the propeller in a definite angular position in said upper initial position and means for indicating the extent of rotary movement from said initial position.

6. A viscosimeter comprising a propeller, a frame including means permitting the propeller to freely rotate about a vertical axis and to bodily move along said axis, means for holding the propeller in an initial upper position, means for limiting its downward movement, and means for indicating the amount of its rotary movement from the initial upper position.

7. A viscosimeter comprising a receptacle for the liquid to be tested, a propeller, means within the receptacle defining a vertical path of movement for the propeller and permitting rotary movement thereof and means extending to points without the receptacle for indicating the extent of rotary motion of the propeller.

8. A viscosimeter comprising a receptacle for the liquid to be tested, a propeller, a vertical shaft cooperating with the propeller to permit the latter to have free bodily and rotary movement, means for limiting free bodily movement to provide a definite fall distance and means extending to points without the receptacle for indicating the extent of rotary motion of the propeller.

9. A viscosimeter comprising a receptacle for the liquid to be tested, a propeller, a vertical shaft within the receptacle about which the propeller is adapted for free rotary and axial movement, means for limiting the axial movement to provide a definite fall distance and means for indicating the extent of rotary motion of the propeller, including means for giving to the propeller a definite initial angular position in its upper limiting position.

In testimony whereof we hereunto affix our signatures this 11th day of July, 1924.

FRANCIS ELLERY FITCH.
MAYSON WHITE TORBET.